United States Patent Office.

JOHN H. STEVENS, OF NEWARK, NEW JERSEY, ASSIGNOR TO THE CELLULOID COMPANY, OF NEW YORK, N. Y., A CORPORATION OF NEW JERSEY.

PYROXYLIN COMPOUND.

SPECIFICATION forming part of Letters Patent No. 561,624, dated June 9, 1896.

Original application filed August 28, 1893, Serial No. 484,234. Divided and this application filed June 17, 1895. Serial No. 553,118. (No specimens.)

*To all whom it may concern:*

Be it known that I, JOHN H. STEVENS, of the city of Newark, county of Essex, and State of New Jersey, have invented certain new and useful Improvements in Compounds of Pyroxylin, of which the following is a specification.

Compounds of pyroxylin, as is well known, are composed of pyroxylin combined with suitable solvents. The solvents are of two kinds—liquid and solid. Ether-alcohol and wood-spirit are good examples of the liquid solvents, and ordinary gum-camphor is a solid solvent.

The present invention relates solely to liquid solvents, and is a division of my original specification, filed August 28, 1893, Serial No. 484,234.

For a description of the state of the art and the nature of solvents of pyroxylin I refer to United States Patent No. 517,987, dated April 10, 1894, granted to me. As a rule the solvents heretofore known have been composed of simple substances or mixtures of the same.

It is the object of the present invention to furnish a series of compound solvents, by the use of which a great many of the important effects desired in pyroxylin mixtures can be cheaply and effectually secured.

The use of solvents composed of mixtures of simple substances has been attended with more or less difficulty, due especially to the different volatilities or lack of harmony or chemical union between the various constituent ingredients of the mixed solvent. Hence in evaporating a thin solution, for instance, to form a film, the action has not been continuous, but the film has been subjected to considerable variation in homogeneity or surface appearance, largely due to these causes.

In carrying out my present invention I prepare a series of solvents by subjecting various mixtures of alcohols to the action of a mixture of formic and sulfuric acids or to any appropriate reaction which will produce formic esters when an alcohol is combined with formic acid. By this means I make solvents of new composition, or a series of complex esters, or esters which not only differ from the solvents heretofore known, but are distinct from a mixture made up of alcohols separately transformed into their respective formates. In my United States Patent No. 269,340 I have disclosed the usefulness of formic ether and formate of amyl.

In the present invention I secure the advantageous action of these two formates, and, as the reaction is extremely complex when the ethyl and amyl alcohols are associated together or with other alcohols during the process of transformation into esters or ethers, producing a series of compound ethers or esters by the reaction between the alcohols and the acids, I obtain a much more stable solvent, for I find that while a mixture of alcohols may be such that the final purified distillates contain liquids of different volatilities the evaporation of my new solvents from pyroxylin compounds is more uniform, and several of the difficulties connected with the use of simple mixtures of solvents heretofore referred to are thus removed.

When I wish a highly-volatile solvent, I subject a mixture of the more volatile alcohols—such as methyl, ethyl, and propyl alcohols—to the action of a mixture of sulfuric and formic acids. On the other hand, when I desire a solvent of low volatility, or one which will permit a compound made with it to dry out slowly, I act on a mixture in which the heavier alcohols preponderate.

In manufacturing the present series of solvents I have found that the following formula will produce an excellent solvent of average volatility, which is useful in dissolving pyroxylin either to a thin or syrupy consistency for use as a varnish or spreading solution, for which a large excess of the solvent is required, or it can be employed in small enough proportions to produce pasty masses, or compounds in which the solvent action is assisted by mastication under heat, in the manufacture of what are known as the "more solid" varieties of pyroxylin compounds, (in the solid mixtures, where molding properties are desired, I prefer to employ camphor in conjunction with the present series of solvents, as it is a well-known agent for securing plasticity in the final product:) wood-spirits, one part, by weight; ethyl alcohol, one part, by weight; crude fusel-oil, one part, by weight; potassium formate, three parts, by weight; sulfuric acid, two parts, by weight. These substances are mixed together and distilled. The distillate is dehydrated and then rectified by a second distillation. As before stated, any equivalent known method which is capable of producing formic esters can be substituted.

By increasing the proportion of alcohols to the acids I get a lighter etherifying effect, which in proportion as the reaction decreases in intensity and amount produces weaker solvents; but even the weak solvents can be usefully employed as diluents or menstrua for use in connection with active solvents. This is especially true of the products of the higher or heavier alcohols; but I have found that it is not practicable to employ alcohols which are higher (speaking chemically) than those found in reasonable quantities of fusel-oil. These diluents are also useful in conjunction with camphor in making the solid compounds.

It is difficult to ascertain chemically why the mixed formic esters produced by the present method are superior to the mixture of separately-made substances. The chemical reaction is principally as follows:

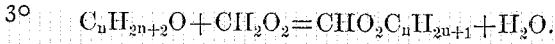

$$C_nH_{2n+2}O + CH_2O_2 = CHO_2C_nH_{2n+1} + H_2O.$$

In the above equation $C_nH_{2n+2}O$ represents the chemical formula of the homologous monohydric aliphatic alcohols, and the term $C_nH_{2n+1}$ represents the radicles of such alcohols when combined with the radicle of formic acid $CHO_2$.

The fact that a solvent produced by acting on a mixture of alcohols and formic with sulfuric acid or other equivalent reagent—gaseous hydrochloric acid, for instance—is superior to a mere mechanical mixture of the formic esters may be due to the presence of unaltered alcohols and of condensation products of such alcohols in such mixtures.

The use of the entire series of solvents which form the basis for the present invention is not incompatible with the employment therewith of other solvents—such as acetone, wood-spirit, acetate of amyl, &c.—although the operator will find that the solvents of this application are capable of a wide range of usefulness, and practically all of the effects obtainable by the employment of such other liquid solvents can be produced with them.

In using the compound solvents produced by the present method a knowledge of the art possessed by the skilled operator is all that is required to enable him to apply them to the various products which it is desired to manufacture. The nature of the solvent is also to be taken into consideration in making these various products, for in evaporating the solvent from the compound (which is always done in practical applications) certain undesirable residues are apt to be left in the product unless care be taken to employ proper solvents for the solution. For instance, a solvent composed largely of methyl alcohol would be likely to leave a weak or watery deposit. Consequently for solutions requiring large proportions of solvent such improved solvents as acetate of amyl, or formate of amyl, or solvents immiscible with water are employed. This, however, is well understood by operators in the art, as is also the fact that whatever be the amount of solvent employed with the pyroxylin or the consistency of the product (by which is meant its stiffness or fluidity) the final result or residue after evaporation of the fluid solvent in every case is a solid form of pyroxylin material—nearly pure pyroxylin in cases where only liquid solvents are employed, or a combination of some solid solvent with the pyroxylin where such solid solvents are used.

It is also understood that the above remarks on the application of solvents apply mainly to liquid solvents, because liquid solvents differ from solid solvents in that they are of more extended applicability, forming, as they do, either stiff masses or liquid solutions simply by varying the proportion of solvent. On the other hand, solid solvents, as is generally recognized, form nothing except a hard dense combination with the pyroxylin, whatever be the proportions employed, unless, of course, they are assisted by or dissolved in a suitable liquid solvent.

While I produce by my invention certain new combinations not heretofore known to me as pyroxylin solvents, yet it is true that there are known solvent substances resulting from the reactions I have described, existing in the final compound solvent as separable bodies exerting their individual solvent powers in the well-known manner. For instance, in acting upon a mixture of the alcohols, as hereinbefore described, one result of the reaction is a production, to some extent, of formate of ethyl and formate of amyl, described by me as solvents in United States Patent No. 269,340, dated December 19, 1882. I recognize, therefore, that in my present compound solvents, wherever the formic ether or formate of amyl occurs, I am using them according to my former invention of December 19, 1882, just referred to. Again, when I am acting on any of the mixtures of alcohols found in the different varieties of fusel-oil to form the present series of solvents some of the unaltered fusel-oils may exist as such in the resulting compound solvent. The use of such unaltered fusel-oil in connection with camphor I recognize as an employment of my Patent No. 269,343, dated December 19, 1882.

I do not herein claim the manufacture or use separately of any of the formic ethers or esters, and I recognize the state of the art as disclosed in other patents and other publications and the experience and knowledge in this manufacture.

What I do claim, and desire to secure by Letters Patent, is—

1. The method of producing pyroxylin compounds, which consists in subjecting pyroxylin to the solvent action of one or more solvents obtained as the result of acting on a mixture of alcohols with formic acid in the presence of a dehydrating agent, substantially as described.

2. As a new composition of matter, a pyroxylin compound containing pyroxylin and one or more solvents which have been obtained as the result of acting on a mixture of alcohols with formic acid in the presence of a dehydrating agent, substantially as described.

3. As a new composition of matter, a pyroxylin compound containing pyroxylin, one or more known solvents of pyroxylin and one or more solvents which have been obtained as the result of acting on a mixture of alcohols with formic acid in the presence of a dehydrating agent, substantially as described.

In witness whereof I have hereunto signed my name this 14th day of June, 1895.

JOHN H. STEVENS.

In presence of—
ABRAHAM MANNERS,
CHAS. W. CONNOR.